(No Model.)

T. COLLINS.
HAY STACKER.

No. 467,856. Patented Jan. 26, 1892.

WITNESSES:
Donn Twitchell
E. M. Clark

INVENTOR
Thomas Collins
BY Munn & Co
ATTORNEYS.

United States Patent Office.

THOMAS COLLINS, OF FORKS, PENNSYLVANIA.

HAY-STACKER.

SPECIFICATION forming part of Letters Patent No. 467,856, dated January 26, 1892.

Application filed September 23, 1891. Serial No. 406,569. (No model.)

*To all whom it may concern:*

Be it known that I, THOMAS COLLINS, of Forks township, county of Sullivan, and State of Pennsylvania, have invented a new and Improved Hay-Stacker, of which the following is a full, clear, and exact description.

My invention relates to an improvement in hay and straw stackers, and has for its object to provide a device adapted to be erected in a mow or shed or in a barn or wherever hay or straw is to be stacked, and which shall be of simple, durable, and economic construction, and, further, to provide a device capable of receiving the hay or straw directly from the fork and of being manipulated from a hay-wagon to distribute hay or straw at any side of the stack that occasion may demand.

Another object of the invention is to provide a device which will be adjustable as to inclination and length and by means of which a stack may be erected of symmetrical shape and without the assistance of a man on the stack to direct the distribution of the hay or straw.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1:
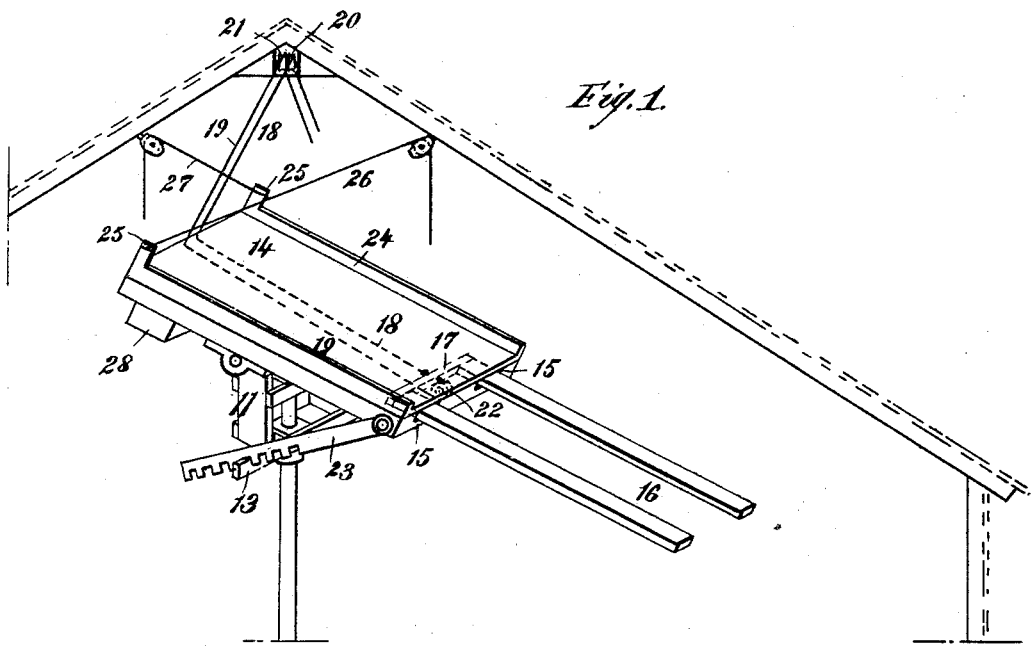
Figure 2:
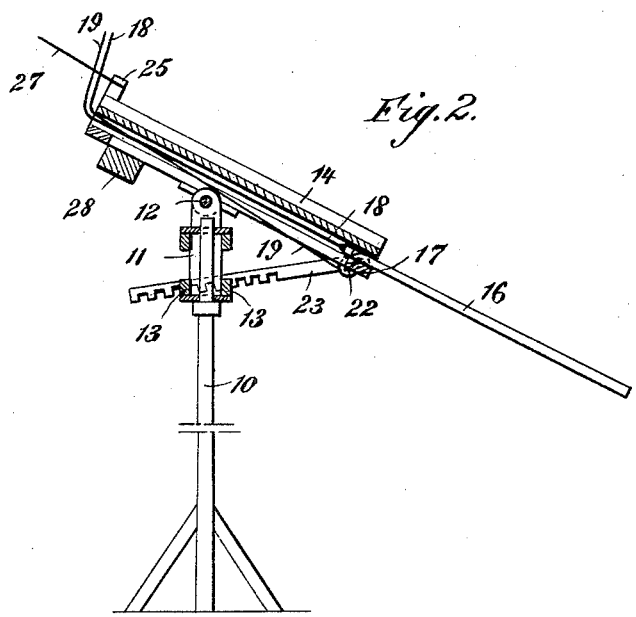

Figure 1 is a perspective view of the device in position beneath a shed, and Fig. 2 is a side elevation, partly in section.

Within the mow, barn, or shed, preferably at the center of the space intended to receive the stack, an upright post 10 is erected, upon which post, at its upper end, a frame 11 is swiveled in a manner to turn around the post. Ears 12 are projected upward from the sides of this frame, and at opposite sides, at the bottom, horizontal bars 13 are located, extending in reverse directions, for a purpose to be hereinafter described.

Upon the ears 12 of the frame a platform 14 is pivoted, the pivotal-point of the platform being at its bottom and at or near its center. The platform is provided in its under surface with slideways and with two openings 15 in its front or lower end. Two bars or beams 16 are passed one through each opening 15 in the platform and enter the slideways thereof, the said beams or bars being connected at their upper or rear ends by a cross-bar 17. The bars or beams form a skeleton frame and an extension of the platform, the said skeleton extension-frame being manipulated through the medium of two ropes or cables 18 and 19. The cable 18 is attached at one end to the cross-bar 17 of the extension-frame and passes over a pulley 20, located, preferably, beneath the central portion of the roof of the barn, mow, or shed in which the hay or straw is to be stacked. By drawing down upon the cable 18 the extension-frame 16 may be drawn upward almost completely or partially within the platform 14, and the extension-platform may be carried downward and outward by gravity when the platform itself occupies an inclined position; but preferably the outward movement of the extension-frame of the platform is produced by the manipulation of the cable 19, which at one end is passed over a friction-pulley 21, adjacent to the pulley 20, as shown in Fig. 1, and the other end of the cable after passing beneath the platform extends upward over the pulley 22, journaled upon the front face of the cross-bar 17 of the extension-frame, and said cable after passing over said pulley is secured to the upper portion of said cross-bar.

The platform 14 and its extension-frame are held at any desired inclination through the medium of rack or toothed arms 23, which are pivoted one to each side of the platform at its front end, and the teeth of these arms engage with the outer projecting ends of the bars 13 upon the swiveled frame, as shown in the drawings. The platform is preferably provided at its sides with guard-rails 24, which rails terminate at their upper or rear ends in studs 25, and to the studs the ends of cables 26 and 27 are respectively attached, said cables being led in opposite directions over suitable pulleys attached to the rafters of the roof of the barn or structure, one at each side of its center, as is best shown in Fig. 1. By the manipulation of these cables 26 and 27 the platform and its extension-frame may be made to rotate through the medium of the swiveled frame upon the upright post 10 and to deposit the hay or straw which is delivered by the fork directly upon the platform at any side of the stack.

All the cables are so located that they will lead down to the wagon, when it is placed in position to discharge its hay, by means of a fork or equivalent device upon the platform.

It will be observed that the device is exceedingly simple, durable, and economic, and that it may be constructed in a manner to accommodate it successfully to any structure in which a stack is to be erected. It is further evident that the device will effectively and regularly deposit the hay or straw in a manner to symmetrically build up a stack without the assistance of a laborer or laborers to locate the hay or straw when placed to form the stack.

A weight 28 is ordinarily secured to the upper or inner end of the platform at its bottom in order that the said platform may be readily turned, as the weight will add momentum thereto when the platform has been given its first movement. The weight may consist of a single piece of metal or stone or a number of pieces, in which latter event a receptacle to receive the pieces is provided and the weight may be placed either at the top or bottom of the platform.

Having thus described my invention, I claim as new and desire to secure by Letters Patent—

1. In a hay or straw stacker, the combination, with a post, of a platform having a swiveled connection with the post, said platform being adapted to receive the hay, a frame sliding in and constituting an extension of the platform, and cables attached to the extension-frame, as and for the purpose specified.

2. In a hay or straw stacker, the combination, with a post and a frame swiveled upon the post, of a platform pivoted upon the frame and provided with a sliding and extension frame, cables attached to the sliding and extension frame, one drawing said frame outward and the other forcing it upward, and a locking mechanism connecting the platform with the swiveled frame, substantially as shown and described.

3. In a hay or straw stacker, the combination, with an upright, of a platform having a swivel and pivotal connection with the upright, and toothed arms pivoted to the platform and having a locking connection with the connection between the platform and upright, substantially as shown and described.

4. In a hay or straw stacker, the combination, with a post, a frame swiveled upon the post, and beams projected from the frame, of a platform pivoted upon the frame and toothed arms pivotally attached to the platform and having a locking engagement with the bars or beams projected from the swiveled frame, as and for the purpose set forth.

5. In a hay or straw stacker, the combination, with a post, a frame swiveled upon the post, and a platform pivoted upon the swiveled frame, of an extension-frame held to slide in the platform, cables attached to the extension-frame, one drawing said frame inward and the other forcing it outward, arms pivoted to the platform and having a locking engagement with the swiveled frame, and cables connected with one end of the platform and carried therefrom in opposite directions, said cables being adapted to turn the platform laterally, substantially as shown and described, and for the purpose specified.

THOMAS COLLINS.

Witnesses:
F. F. CHASE,
N. A. RINEBOLD.